Oct. 14, 1969    E. K. ZORN    3,471,868
ULTRASONIC SENSING DEVICE FOR A FLUSHING
VALVE ON A PLUMBING FIXTURE
Filed Jan. 25, 1968
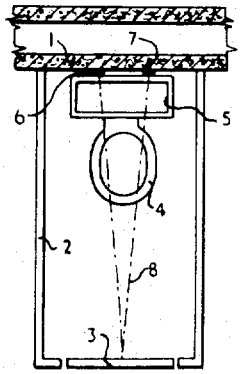
FIG. 1.
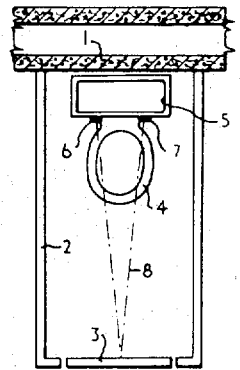
FIG. 2.
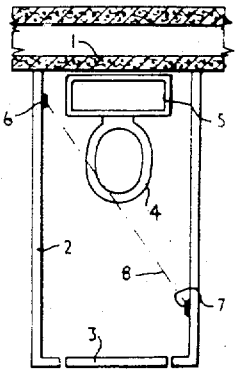
FIG. 3.
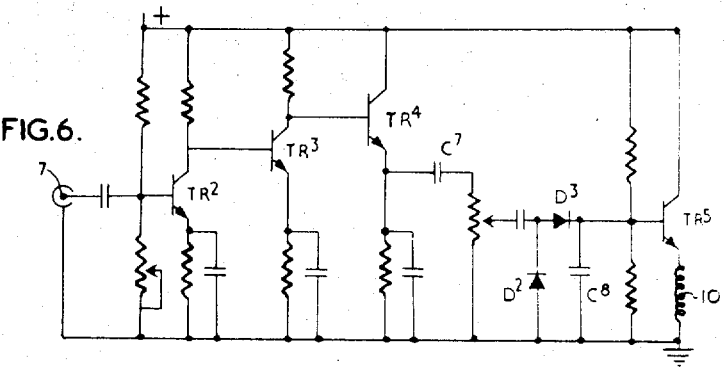
FIG. 6.
FIG. 4.
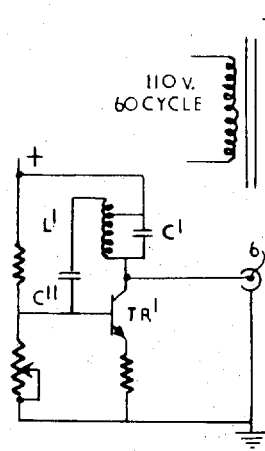
FIG. 5.
INVENTOR
EUGENE K. ZORN
ATTORNEY United States Patent Office 3,471,868
Patented Oct. 14, 1969

3,471,868
ULTRASONIC SENSING DEVICE FOR A FLUSHING VALVE ON A PLUMBING FIXTURE
Eugene K. Zorn, Cornwall, Ontario, Canada, assignor to Palleon Electronics Limited, Cornwall, Ontario, Canada
Filed Jan. 25, 1968, Ser. No. 700,426
Int. Cl. E03d 5/10
U.S. Cl. 4—100                4 Claims

ABSTRACT OF THE DISCLOSURE

An ultrasonic sensing device for the valve actuator of a plumbing fixture, employing a spaced pair of transducers so related to the fixture that their sound beam must be intercepted by a person using the fixture; the receiving transducer circuit including a normally energized relay that connects with the valve controlling solenoid through a suitable timing circuit. The fixture is desirably enclosed in a cubicle, compartment or the like and the transducers incorporated in the fixture per se with the uninterrupted beam bouncing off one of the surfaces of the cubicle.

---

The present invention relates to an ultrasonic sensing device for the automatic flushing of toilets, urinals and the like.

In public buildings especially, the flushing of toilets and similar plumbing fixtures has long been a problem because when left to the user the flushing is often left undone and when intermittently operated by an automatic device the frequent flushing at times when not required causes unwarranted waste of water. To overcome these recognized deficiencies, various attempts have been made to produce a satisfactory user-actuated automatic flushing apparatus that will assure the flushing after every occasion that the unit is used whilst preventing any accidental or other untimely operation. Intruder actuated or person sensing control means have been developed employing light sensitive photoelectric cell and capacity sensing circuits—see United States patents, Tekenos et al. No. 2,858,546; Gelhar No. 3,131,880; and Lefebvre No. 3,193,846, and my copending application "Automatic Flushing Apparatus for Toilets," Ser. No. 695,054, filed Jan. 2, 1968.

When using a photocell operator, regard must be had for the ambient light situation as well as the limitation of the effective distance of the light beam. With capacity detecting apparatus, various environmental factors have caused difficulties.

This invention contemplates a spaced pair of low voltage transmitting and receiving transducers that adapt very well to incorporation in a toilet or other plumbing installation because of the ease of sound reflection. Furthermore, with transducer controlled frequency, stability is assured, interference kept to a minimum, and the broadcast therefore effective over a substantial distance.

Accordingly, it is an object of this invention to provide an automatic valve actuator for a toilet or other plumbing fixture under the control of an ultrasonic sensing device.

A further object of the invention is to provide an ultrasonic sensing device suitable for actuating the valve in either tank type or pressure line flush valve toilets.

A further object of the invention is to provide an ultrasonic sensing device for an automatic toilet valve actuator employing a spaced pair of transducers installed relative to the toilet fixture so that their projection is intercepted by a person during use of the fixture.

A further object of the invention is to provide an ultrasonic sensing device for an automatic toilet valve actuator with either or both the sensor and emitter incorporated in the fixture.

A still further object of the invention is to provide an ultrasonic sensing device for the valve actuator of a plumbing fixture installed in a compartment, cubicle or the like with a pair of transmitting and receiving transducers incorporated in the fixture in spaced relation in such wise that their sound beam is normally bounced off one of the surfaces of the fixture-surrounding compartment.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

In the drawings:

FIGURE 1 is a schematic plan of a conventional tank-type fixture enclosed in a small cubicle with a pair of transducers so mounted at the back of the toilet tank that their sound beam is bounced off the cubicle door;

FIGURE 2 is a similar schematic plan showing the transducers mounted on opposite sides of the toilet fixture in advance of the tank;

FIGURE 3 is another similar schematic plan showing the spaced pair of transducers disposed diagonally on opposite side walls of the cubicle;

FIGURE 4 is a diagram of the power supply circuit;
FIGURE 5 is a diagram of the transmitter circuit; and
FIGURE 6 is a diagram of the receiver circuit.

Because of the known development that has been made in automatic toilet flushing apparatus as evidenced in the aforementioned patents to Tekenos et al., Gelhar, Lefebvre and others, it is not felt necessary to illustrate or describe the solenoid valve actuator per se nor the timing circuit therefor as suitable examples of the former will be found in Gelhar No. 3,131,880 and Lefebvre No. 3,193,846, and the latter is specifically set forth in my above identified copending application entitled "Automatic Flushing Apparatus for Toilets," that discloses both an electric motor controlled timing apparatus and an alternative transistorized timing circuit. Suffice it to say here that this ultrasonic sensing device is useable with a toilet, urinal or other valved plumbing fixture equipped with a suitable solenoid actuated valve, which may have a timing circuit for the solenoid that, if employed, is preferably connected through a relay with the receiver circuit of the sensing device.

Referring now to the drawings, the reference character 1 designates a building wall against which a toilet cubicle is erected having opposite side walls 2 and a door closure 3 across the front end opposite the wall 1. A conventional toilet fixture 4 with a tank 5 is mounted against the building wall 1 and supplied with a water service (not shown) in the usual way. The flush valve in the tank is designed for operation by a controlling solenoid in known manner, the ultrasonic sensing device for actuating the valve controlling solenoid including a spaced pair of transducers 6 and 7 that transmit and receive a sound beam indicated by the dash-dot line 8. In FIGURE 1, the transducers are shown located at the back of the tank 5 and in FIGURE 2 mounted on the toilet fixture 4 in front of the tank, with the sound beam in each case being bounced by the cubicle door 3 and subject to interception by a person using the toilet. In FIGURE 3 the emitting and receiving transducers 6 and 7 are mounted in diagonally disposed positions on opposite side walls 2 of the cubicle again in such wise that their projection must be intercepted by anyone using the toilet 4. Thus it will be seen that I may mount the spaced pair of transducers in any of a variety of positions on the fixture per se, or any surface of the cubicle, side walls, ends, floor or ceiling as desired or found convenient providing the sound beam direct or bounced is inescapably intercepted by any user of the fixture.

Moving now to the specific ultrasensing device circuits shown in FIGURES 4, 5 and 6, the power supply is seen in FIGURE 4 as having a 110 volt 60 cycle power line source feeding a transformer $T^1$ that provides a 25 volt circuit for the transmitting and receiving transducer circuit, illustrated respectively in FIGURES 5 and 6, through a diode bridge $D^1$ whose positive lead includes a resistor $R^{15}$ and whose negative lead connects with the positive lead on each side of the transistor with capacitors $C^9$ and $C^{10}$.

The transmitting circuit, FIGURE 5, shows the transducer 6 driven directly by a transistor oscillator $TR^1$. The coil $L^1$ and capacitor $C^1$ from the resonant tank circuit to develop the 25 kc. frequency. Feed back from the top of coil $L^1$ through capacitor $C^{11}$ to the base of the transistor will help to sustain oscillation.

In the receiver circuit, FIGURE 6, it will be seen that transistor $TR^2$, $TR^3$, $TR^4$ and $TR^5$ provide conventional amplifier stages. The transistor $TR^4$ is an emitter follower which drives the voltage doubler rectifier circuit, consisting of capacitors $C^7$, $C^8$ and diodes $D^2$, $D^3$. Transistor $TR^5$ receives the DC voltage from the rectifier circuit, amplifies it and operates the relay 10. In this way the relay is energized when a signal is present at the receiving transducer 7, i.e., when no one is present at the toilet fixture to intercept the sound beam.

Beyond the relay 10, a rectified DC signal may be used to drive a transistorized timing circuit with a thyrister employed to operate the load or the motor switches and relays apparatus of my said copending application may be used as the chosen means for actuating the valve controlling solenoid.

Thus it will be seen that this system effectively employs an ultrasonic beam of sound for detecting the presence of the user, the emitting device including a transmitter that broadcasts an inaudible ultrasonic sound at a frequency of 25,000 cycles, which is approximately 10,000 cycles above the hearing range of most people. The receiver detects this sound, amplifies rectifier and doubles it and then through the action of its relay connects by an appropriate time delay circuit with a toilet valve controlling solenoid or the like.

It is to be understood that instead of the toilet tank and valve therefor, the plumbing unit may be served by a direct water pressure line with a solenoid valve therein so that the energizing of the solenoid will likewise serve to supply water to the fixture, and even to provide for a double flush as set forth in the said copending application if so desired.

From the foregoing description taken in connection with the accompanying drawings, it will be manifest that an ultrasonic sensing device for the automatic flushing of toilets, urinals and the like is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

What is claimed as new is:

1. An ultrasonic sensing device for a plumbing fixture valve actuator comprising in combination with an electric power source, a valve controlling solenoid, and a timing circuit therefor; a spaced pair of transducers so disposed that their sound beam must be intercepted by a person during his use of the fixture; a transmitting transducer circuit; a receiving transducer circuit including a relay; said relay connecting with said timing circuit and being normally de-energized when said sound beam is broken by an intruder; said valve controlling solenoid, said timing circuit, and said transmitting and receiving transducer circuits being supplied by said electric power source.

2. The ultrasonic sensing device according to claim 1, wherein the transmitting transducer circuit includes a transistor oscillator which directly drives the transducer; a coil and capacitor forming a resonant tank circuit to develop 25 kc. frequency, and a feed back from the top of the coil through a second capacitor to the base of the transistor to help sustain oscillation; and the receiving transducer circuit includes amplifying stage transistors, an emitter follower transistor, a voltage doubler and rectifying section consisting of capacitors and diodes driven by said last mentioned transistor, and another transistor receiving the DC voltage from the rectified current and amplifying and supplying it to said relay to energize the same when the sound beam from the transmitting transducer is uninterrupted.

3. The ultrasonic sensing device according to claim 1, wherein said transducers are incorporated in spaced relation in the fixture.

4. The ultrasonic sensing device according to claim 3 wherein the plumbing fixture is enclosed in a cubicle, compartment, and the sound beam is normally bounced off one of the surfaces thereof.

References Cited
UNITED STATES PATENTS

| | | | |
|---|---|---|---|
| 2,603,794 | 7/1952 | Bokser | 4—100 |
| 2,738,448 | 3/1956 | Bokser | 4—100 XR |
| 3,133,204 | 5/1964 | Winchel. | |
| 3,339,212 | 9/1967 | Atkins et al. | 4—100 |
| 3,416,162 | 12/1968 | Hamblen | 4—100 |
| 3,434,164 | 3/1969 | Forbes | 4—100 |

LAVERNE D. GEIGER, Primary Examiner

HENRY K. ARTIS, Assistant Examiner

U.S. Cl. X.R.

317—147, 148.5